(12) United States Patent
Lo Faro et al.

(10) Patent No.: US 9,286,618 B2
(45) Date of Patent: Mar. 15, 2016

(54) RECOGNIZING AND COMBINING REDUNDANT MERCHANT DESIGNATIONS IN A TRANSACTION DATABASE

(71) Applicant: MASTERCARD INTERNATIONAL INCORPORATED, Purchase, NY (US)

(72) Inventors: Walter Francis Lo Faro, Chesterfield, MO (US); Steve Oshry, Bronxville, NY (US); Anita Christine Galliani, Lake St. Louis, MO (US); Gary Randall Horn, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 256 days.

(21) Appl. No.: 13/791,078

(22) Filed: Mar. 8, 2013

(65) Prior Publication Data

US 2014/0258246 A1    Sep. 11, 2014

(51) Int. Cl.
  *G06F 7/00*   (2006.01)
  *G06Q 30/02*  (2012.01)

(52) U.S. Cl.
  CPC ...................................... *G06Q 30/02* (2013.01)

(58) Field of Classification Search
  None
  See application file for complete search history.

(56) References Cited

U.S. PATENT DOCUMENTS

| | | | |
|---|---|---|---|
| 8,219,550 B2 | 7/2012 | Merz et al. | |
| 2002/0099536 A1* | 7/2002 | Bordner | G06F 17/277 704/10 |
| 2002/0124015 A1* | 9/2002 | Cardno et al. | 707/204 |
| 2003/0036998 A1* | 2/2003 | Alliston | G06Q 20/00 705/40 |
| 2004/0267743 A1* | 12/2004 | Dasari | G06F 17/30303 |
| 2008/0262925 A1* | 10/2008 | Kim et al. | 705/14 |
| 2010/0169192 A1* | 7/2010 | Zoldi | G06Q 40/12 705/30 |
| 2011/0106607 A1* | 5/2011 | Alfonso et al. | 705/14.25 |
| 2011/0178855 A1* | 7/2011 | Rane et al. | 705/14.13 |
| 2011/0313900 A1* | 12/2011 | Falkenborg et al. | 705/30 |
| 2012/0278249 A1* | 11/2012 | Duggal | G06Q 40/08 705/325 |
| 2014/0258169 A1* | 9/2014 | Wong | G06Q 30/0282 705/347 |

* cited by examiner

*Primary Examiner* — Fred I Ehichioya
*Assistant Examiner* — Hasanul Mobin
(74) *Attorney, Agent, or Firm* — Hoffman & Baron, LLP

(57) ABSTRACT

Determining whether two merchant location database entries are describing the same merchant location. A subject merchant location database entry and comparison candidate merchant location database entries include a DBA name field, a street address field, and one or more additional descriptive fields descriptive of one or more predetermined characteristics of the respective merchant location. The subject merchant location database entry is compared to a set populated with candidate merchant location database entries, candidates having a predetermined minimum textural similarity with the subject merchant location database entry on the basis of each entry's DBA name field or street address field. The subject merchant location database entry is compared with each of the candidate database entries on the basis of the one or more additional descriptive fields, and a logistic regression is performed using the results of the comparing, in order to calculate a probability that the database entries refer to the same merchant location.

15 Claims, 3 Drawing Sheets

RECOGNIZING AND COMBINING REDUNDANT MERCHANT DESIGNATIONS IN A TRANSACTION DATABASE

BACKGROUND

1. Field of the Disclosure

The present disclosure relates to electronic transaction processing. More specifically, the present disclosure is directed to method and system for identifying duplicate merchant locations among database entries in a merchant database.

2. Brief Discussion of Related Art

The use of payment devices for a broad spectrum of cashless transactions has become ubiquitous in the current economy, according to some estimates accounting for hundreds of billions or even trillions of dollars in transaction volume annually. The process and parties typically involved in consummating a cashless transaction can be visualized for example as presented in FIG. 1, and can be thought of as a cycle, as indicated by arrow 10. A device holder 12 may present a payment device 14, for example a payment card, transponder device, NFC-enabled smart phone, among others and without limitation, to a merchant 16 as payment for goods and/or services. For simplicity the payment device 14 is depicted as a credit card, although those skilled in the art will appreciate the present disclosure is equally applicable to any cashless payment device, for example and without limitation contactless RFID-enabled devices including smart cards, NFC-enabled smartphones, electronic mobile wallets or the like. The payment device 14 here is emblematic of any transaction device, real or virtual, by which the device holder 12 as payor and/or the source of funds for the payment may be identified.

In cases where the merchant 16 has an established merchant account with an acquiring bank (also called the acquirer) 20, the merchant communicates with the acquirer to secure payment on the transaction. An acquirer 20 is a party or entity, typically a bank, which is authorized by the network operator 22 to acquire network transactions on behalf of customers of the acquirer 20 (e.g., merchant 16). Occasionally, the merchant 16 does not have an established merchant account with an acquirer 20, but may secure payment on a transaction through a third-party payment provider 18. The third party payment provider 18 does have a merchant account with an acquirer 20, and is further authorized by the acquirer 20 and the network operator 22 to acquire payments on network transactions on behalf of sub-merchants. In this way, the merchant 16 can be authorized and able to accept the payment device 14 from a device holder 12, despite not having a merchant account with an acquirer 20.

The acquirer 20 routes the transaction request to the network operator 22. The data included in the transaction request will identify the source of funds for the transaction. With this information, the network operator routes the transaction to the issuer 24. An issuer 24 is a party or entity, typically a bank, which is authorized by the network operator 22 to issue payment devices 14 on behalf of its customers (e.g., device holder 12) for use in transactions to be completed on the network. The issuer 24 also provides the funding of the transaction to the network provider 22 for transactions that it approves in the process described. The issuer 24 may approve or authorize the transaction request based on criteria such as a device holder's credit limit, account balance, or in certain instances more detailed and particularized criteria including transaction amount, merchant classification, etc., which may optionally be determined in advance in consultation with the device holder and/or a party having financial ownership or responsibility for the account(s) funding the payment device 14, if not solely the device holder 12.

The issuer 24 decision to authorize or decline the transaction is routed through the network operator 22 and acquirer 20, ultimately to the merchant 16 at the point of sale. This entire process is typically carried out by electronic communication, and under routine circumstances (i.e., valid device, adequate funds, etc.) can be completed in a matter of seconds. It permits the merchant 16 to engage in transactions with a device holder 12, and the device holder 12 to partake of the benefits of cashless payment, while the merchant 16 can be assured that payment is secured. This is enabled without the need for a preexisting one-to-one relationship between the merchant 16 and every device holder 12 with whom they may engage in a transaction.

The issuer 24 may then look to its customer, e.g., device holder 12 or other party having financial ownership or responsibility for the account(s) funding the payment device 14, for payment on approved transactions, for example through an existing line of credit where the payment device 14 is a credit card, or from funds on deposit where the payment device 14 is a debit card. Generally, a statement document 26 providing information on the account of a device holder 12, including merchant data as provided by the network operator 22.

The network operator 20 can further build and maintain a data warehouse which stores and augments transaction data, for use in marketing, macroeconomic reporting, etc. To this end, transaction data from multiple transactions is aggregated for reporting purposes according to a location of the merchant 16. Additionally, one merchant 16 may operate plural card acceptance locations. Consider, for example, a chain or franchise having multiple business locations. These merchant locations are beneficially aggregated and assigned an aggregate merchant identifier for reporting purposes.

Of the actors in the transaction process, the merchant's data tends to be the least stable and most difficult to deal with. One of the challenges with merchant data is the fact that there is no universal merchant identifier. Rather, the network operator 22 must build and maintain the data warehouse on its own, derived from merchant data included in the transaction data delivered via the acquirer 20. Similarly, there is no reliable identifier on the data received that indicates if the transactions from more than one device acceptance terminal are associated with a single merchant, as there may be plural such terminals at a given merchant location, and/or they may be serviced by different acquirers 20.

If the merchants 16 and acquirers 20 remained consistent or predictable the way in which they submit their data, there would be no need to monitor the integrity of this data; however, they do not. Merchants 16 can change acquirers 20; they open and close locations; they rebrand themselves—just to name a few of the challenges. When any of these or other changes to merchant data happen, the rules used to assign an identifier to a merchant location often fail. Ultimately, the network operator 22 must rely on imperfect inference from the transaction data to perform its merchant aggregation.

Even cursory human oversight of each and every merchant location would be prohibitively expensive considering the total number of merchants 16 accepting authorized payment devices 14, or even that subset of merchants whom the network operator 22 wishes to monitor. A solution to this aggregate merchant data quality deficit problem therefore remains wanting.

SUMMARY

MasterCard International, the assignee of the instant application, in its capacity as network operator 22 in the above-described process, has developed a solution to the problem of merchant data quality deficit.

Provided according to the present disclosure is a method of determining whether a subject merchant location database entry and a candidate merchant location database entry are describing the same merchant location, notwithstanding the presence of differences between the subject merchant location database entry and the candidate merchant location database entry. Each of the subject merchant location database entry and the candidate merchant location database entry includes a DBA name text field designating the doing business as (DBA) name of each respective merchant location, a street address text field designating the street address of the location of each respective merchant location, and one or more additional descriptive fields descriptive of one or more predetermined characteristics of the respective merchant location.

According to the disclosed method, a merchant location database entry to be compared is designated as a subject merchant location database entry. A set is populated with one or more candidate merchant location database entries for comparison to the subject merchant location database entry, with each candidate merchant location database entry selected as a member of the set having a predetermined minimum textural similarity with the subject merchant location database entry on the basis of each database entry's respective DBA name text field or street address text field. In a more particular embodiment of the disclosed method, populating a set with one or more candidate merchant location database entries comprises selecting those entries whose DBA name text field or street address text field exhibit a threshold numerically calculated degree of textual similarity with the corresponding DBA name text field or street address text field of the subject merchant location database entry.

The subject merchant location database entry is compared with each of the candidate database entries on the basis of the one or more additional descriptive fields, and a logistic regression is performed using the results of the comparing, in order to calculate a probability that the merchant location corresponding to the subject merchant location database entry and the merchant location corresponding to one or more of the candidate merchant location database entries are the same merchant location. The results of the logistic regression are provided as an output of the method.

In a more particular embodiment of the disclosed method, the one or more additional descriptive fields include at least one field containing data of selected from the group comprising a classification code related to the respective merchant's line of business, a merchant location city, a merchant location zip code, a flag related to whether the merchant location has a taxpayer identification number, a merchant location taxpayer identification number, a flag related to whether the merchant location has an acquirer-defined merchant identification, an acquirer-defined merchant location identification, a flag related to whether the merchant location is part of a group of merchant locations that are considered in the aggregate, a label related to a group of merchant locations with which the individual merchant location is considered in the aggregate, and an identifier applied to the merchant location by a third party service provider.

In a more particular embodiment of the disclosed method, the classification code is derived from a hierarchical classification, and comparing determines whether the respective merchant classification codes are identical, are related by being in the same branch of the hierarchy, or are unrelated. Alternately or additionally, determination is made whether the subject merchant location database entry or the candidate merchant location database entry include a classification code related to an industry which is experientially known to have merchant identification data that is either more stable than or less stable than other industries. The logistic regression weights the merchant classification code with regard to whether the related industry is known to have more or less stable merchant identification data.

In a more particular embodiment, the method further comprises making a determination that the subject merchant data entry and one or more of the candidate merchant data entries relate to the same merchant where the results of the logistic regression indicate a probability that is equal to or greater than a predetermined threshold.

The present disclosure further provide an electronic system including a processor and a machine readable memory tangibly embodying a program of instructions which, when executed by the processor cause the processor to carry out the method described above. The present disclosure further provide for a machine readable memory tangibly embodying such a program of instructions.

These and other purposes, goals and advantages of the present disclosure will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings, in which like reference numerals refer to like structures across the several views, and wherein.

DETAILED DESCRIPTION

Figure 1:
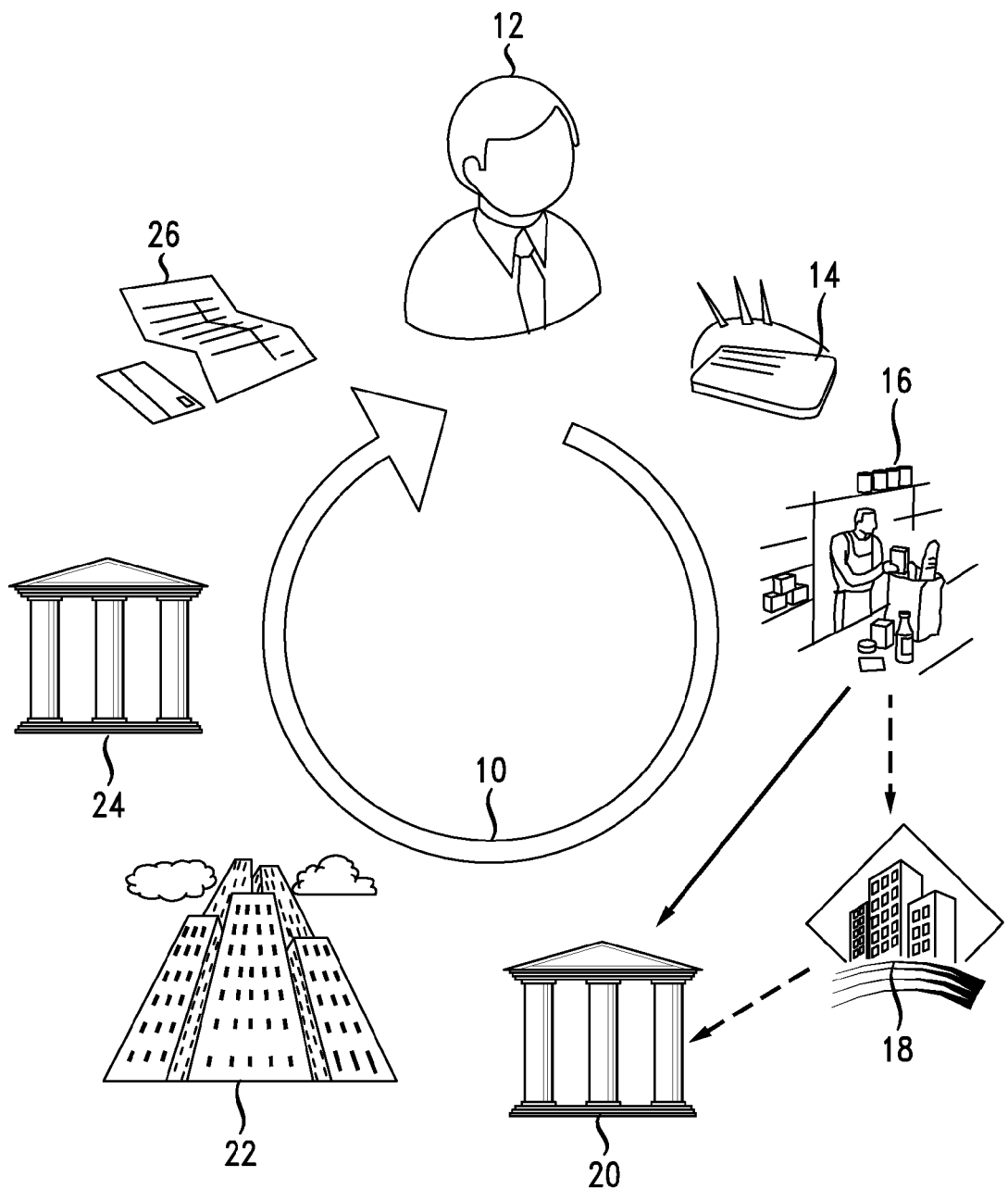
FIG. 1 illustrates a representative cycle for cashless transaction processing.

The network operator 22 maintains a data warehouse that includes a comprehensive list of merchant authorized to accept its branded transaction device 14 in payment for goods and services. However, there is no unique identifier of the accepting merchant location in the stream of transaction data. Therefore, the task of maintaining this comprehensive list is a daunting one.

The network operator 22 maintains sets of key fields derived from several raw data elements present in the transaction data stream. When a transaction is processed for merchant location assignment, the transaction data is compared to the sets of keys. If a match, i.e., a perfect match, is found, the corresponding merchant location identifier is assigned. If a match is not found, a new value is added to the keys, i.e., a new merchant location is created. Herein lies the challenge. The acquirer data from which the keys are built can be very unstable, notwithstanding the continuity of the underlying merchant location associated with the transaction. Merchant DBA (i.e., 'Doing Business As') name and street addresses are critical data elements to the merchant location assignment process. A common manifestation of this instability is a perturbation in any of the fields used for key assignment. This often causes the spurious creation of a new merchant location. There are processes currently in place to check for this but they are designed to do so conservatively, thus erring on the side of creating a new location, i.e., failing to consolidate two merchant location database entries despite some indication that the two entries are in fact referring to the same merchant location. The system described herein is designed to do so more aggressively. Furthermore, it does so in a fundamentally different way than the present processes.

Among the problems influencing the above-described merchant location data quality deficit is that, for example with regard to the largest merchants having a regional or national (even international) chain of stores, they may use more than one acquirer 20 to process all of their transaction volume across the chain. Such merchants may have corporate or branding subsidiaries (e.g., TOYS R US & KIDS R US), and the use of a single acquirer 20 may not be consistent within or across a given merchant subsidiary. The acquirer 20 used may be without regard to plural acceptance terminals at a given location of a merchant 16. Meanwhile, each acquirer 20 may have a different data format for merchant name and location. In some cases, multiple terminals, even those processed through the same acquirer 20 and in the same location of a given merchant 16, may have variations in merchant name and location data presentation as these were set at an installation of the acceptance terminal, etc.

Consider the following two entries in the merchant location master database (anonymized):

| Location_ID | DBA_NAME | ADDRESS | CITY | STATE |
| --- | --- | --- | --- | --- |
| 273,572,228 | SUPER WIDGETS DISCOUNT | 1926 MIDDLEBELT | LIVONIA | MI |
| 368,755,947 | SUPER WIDGETS DISC | 1926 MIDDLEBELT RDUS | LIVONIA | MI |

This merchant's data had been coming in the data stream formatted as in the first row, which was assigned Location_ID no. 273,572,228. However, without notice, the transaction data began coming in as the second row, which was assigned Location_ID 368,755,947. The changes in DBA_NAME and ADDRESS caused the incorrect creation of a new merchant location. These entries concern the same merchant location, one doing business as "Super Widgets Discount" with a location at number 1926 on Middlebelt Road, in Livonia, Mich. However, the differences in data presentation preclude a perfect match between the entries, and therefore an additional merchant location is spuriously created. Looking to the transaction data stream, it would appear as if the merchant location in the first line has stopped doing business or stopped accepting the payment device 14, with a new merchant location in second line having opened or newly begun accepting the payment device. In reality, the new merchant location is created solely because the automated data warehouse processes cannot recognize the correspondence between the two merchant location IDs, due to the perturbation of DBA and address data presentation.

One method proposed to address the problem of merchant location data inconsistency is offered in U.S. Pat. No. 8,219,550, issued 10 Jul. 2012 to Merz, et al., ("Merz") which is commonly assigned with the instant application and is hereby incorporated by this reference in its entirety for all purposes. Merz provides an approximate string matching technique, which will compare a new or unmatched data field encountered in the stream of transaction data processing, for example merchant name or location, against existing corresponding data fields in the database. The technique provides a numeric value representing a degree of similarity between the new or unmatched data field and one or more candidate approximate matches in the database. For example, the numeric value may be calculated as a score falling in a range between zero and one, where zero indicates no textural commonality, and one indicate identity between the two compared data fields. The degree of similarity information is taken into account by a human analyst, in order to make a determination whether there is a match between the new or unmatched data field and one or more of the existing database entries.

However, even a threshold degree of textural similarity between two data entries does not conclusively establish that two merchant location ID entries are in fact referring to the same merchant location. The single best way to accomplish this task is by human interaction. In fact, assignee MasterCard International Incorporated maintains a team of skilled merchant location analysts whose job is to perform tasks like these. Analysts would score location pairs output from the approximate string matches as being an actual match or not. Unfortunately, the scale of the work involved in this application precludes the team of available analysts from comprehensively matching all merchant location ID entries in the master database.

Figure 2:
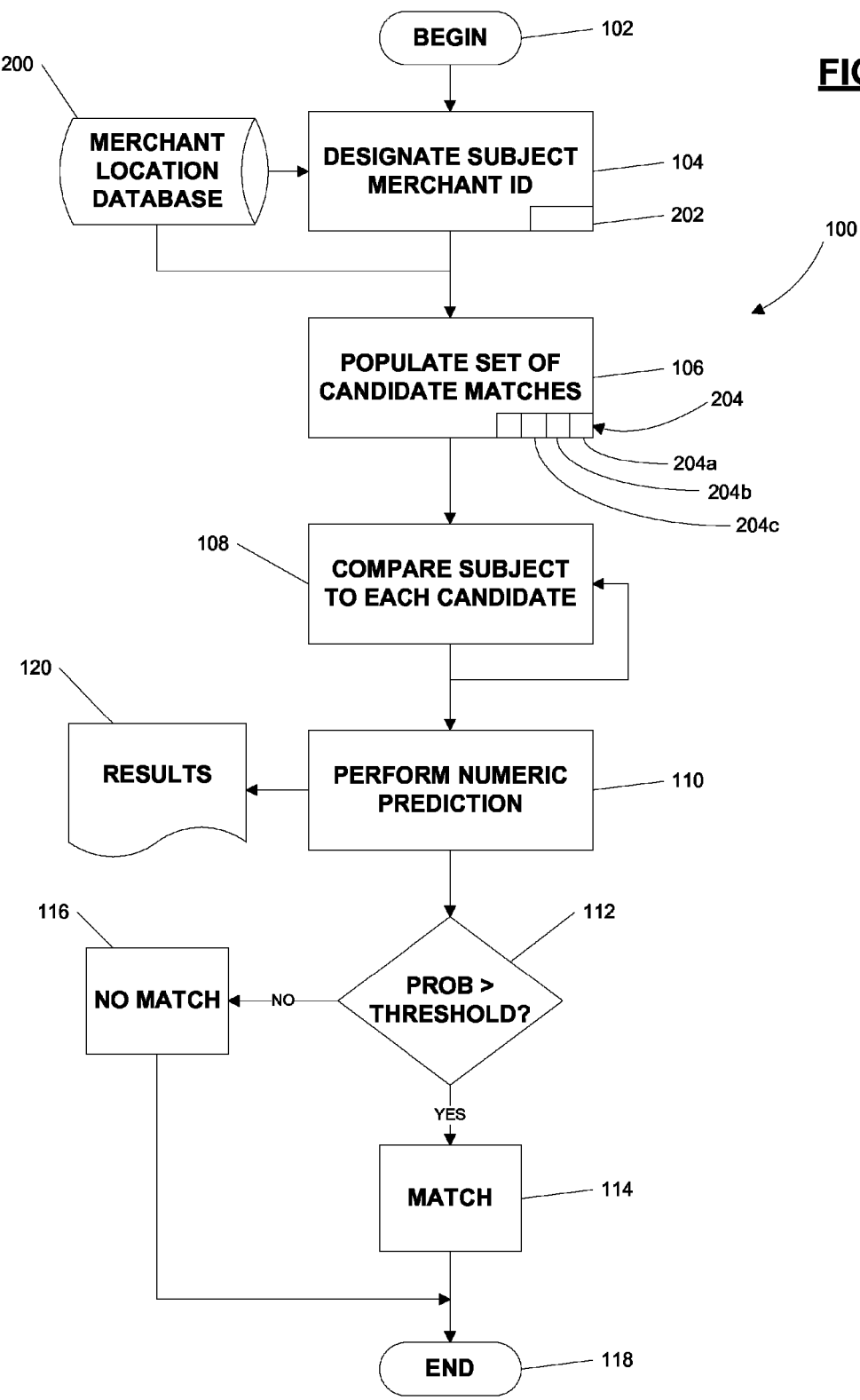
FIG. 2 illustrates a flowchart for carrying out a method of for determining whether a subject merchant location database entry and a candidate merchant database entry are describing the same merchant.

The present disclosure proposes to automate the matching process to a higher degree of accuracy. To that end, FIG. 2 illustrates a flowchart 100 outlining steps in a process of recognizing and combining redundant merchant location designations in a transaction database.

From a beginning 102 of the process, a first subject merchant location 202 to be matched is designated 104. The subject merchant location 202 can be one merchant location chosen from the master merchant location database 200, either systematically or in a randomized fashion. In that case, the process of recognizing and combining redundant merchant locations can be viewed as a task of maintaining the database 200. However, performing an exhaustive and recursive match process on each of millions of entries in the master merchant location database this can be computationally expensive and time-consuming, and it is not clearly advantageous from a cost-benefit consideration.

Alternately, the subject merchant location 202 may be chosen from a set of new merchant locations as they periodically appear in the transaction data stream, i.e., any merchant locations that do not have an existing perfect match in the master merchant location database 200. Finding a match with regard to such new merchant locations would effectively eliminate the problem of spurious duplicate merchant location IDs in the master merchant location database 200 before it occurs, i.e., a form of preventative maintenance.

Having designated a subject merchant location 202 to be matched, a set of potential matching merchant locations 204 is populated 106, including merchant locations 204a, 204b, 204c, etc., which are drawn from among the entire master merchant location database 200. At least one method of populating the set of potential matches is disclosed in the Merz patent discussed above. For example, any corresponding merchant location having a similarity value with the designated subject merchant location meeting or exceeding a predetermined threshold value may be selected for inclusion in the set. Other methods may be suitable to achieve the goal of limiting the set of potential matches to a computationally manageable number.

Thereafter, a comparison is made 108 between merchant location characteristics of the designated subject merchant location 202 and each member 204a, 204b, 204c, etc. of the set 204 of potential matches, in an iterative manner. The comparison is formed on the basis of other information about the both the subject merchant location 202 and the potential matching merchant locations 204a, 204b, 204c, etc., such other information being is included in the merchant location record entry corresponding to them, respectively, in the master merchant location database 200. For example where the Merz technique is used, there is a numerical value assigned which corresponds to the degree of similarity between the DBA name of the two merchant locations being compared. Likewise, a similarity value can be computed with respect to the street address field of each merchant location being compared. However, as noted, these fields tend to be the most volatile. Other fields are less susceptible to variation, and can therefore be used to inform the determination whether the designated subject merchant location 202 is a match to one or more potential matching merchant locations 204*a*, 204*b*, 204*c*, etc. of the set 204.

Among the other data fields to be looked to are the Merchant Classification Code (MCC), which is a classification of the line of business in which a particular merchant location is engaged, drawn from a standardized hierarchical directory. Merchant Classification Code in particular can be used in two ways to determine whether a match exists between two merchant location entries. Initially, it can be examined for full or partial correspondence between the two merchant location entries under consideration. Full correspondence will be self-explanatory. With regard to partial correspondence, because the MCC classification is hierarchical in nature, two different MCC classifications may be related to one another, though not identical. For example, one entry may be a sub-classification of the other, and one or more levels removed from each other. Alternately or additionally, two MCC classifications may be considered related if they lie within the same branch of the hierarchy, though not directly related to one another as sub-classifications. Two related MCC classifications can still suggest that a match between the two merchant locations is more likely than if they were not related.

The foregoing test for full or partial relatedness is made without regard to the specification classification. Alternately or additionally, the MCC of one or both merchant location records under consideration might be used to influence the determination of how likely the two are a match. For example, it is known from experience and empirical data that certain fields of business tend to have more unstable data streams than others. Therefore, if the MCC of either merchant location under consideration falls within one of those fields, whether a perfect or partial match, it will affect the likelihood that there is a match. In other words, ceterius paribus, all other factors being equal, two merchant locations can be considered as more likely being a match if either or both are engaged in a line of business that is known to have more unstable data than others. On the other hand, considering a line of business where the data is known to be more stable, the tolerance to find a match may be higher than otherwise might be the case where the merchant locations engage in fields of business that were known to promulgate less stable data.

Other data fields may suggest merchant location correspondence to a greater or lesser degree. For example, merchant location city and or zip tend to be less susceptible to vagaries of equivalent data input style, as compared to street address (consider "909 10$^{th}$ St N" v. "909 North Tenth Street"). However, this again is only indicative, and not conclusive of a positive or negative match. City designation in the merchant location fields may be consistent with either political subdivision or USPS designation, which are not always consistent with one another. These fields are also less specific, i.e., there many merchant locations within a given city or zip.

Other data fields that are associated with the merchant location are certain flag fields that are applied by the network operator 22. For example, the merchant location data entry will include a flag indicating if the acquirer-defined merchant location IDs match between the candidate merchant location 202 and the member of the set 204 forming the basis for comparison; a flag indicating if the respective merchant locations' Taxpayer Identification Numbers (TIN) are a match with each other; a flag indicating if the merchant location is part of an aggregate merchant, e.g., a member of a broader franchise or chain for other reporting purposes. If it is the case that the candidate merchant location 202 and any of the potential matching merchant locations 204*a*, 204*b*, 204*c*, etc., are alike in that both have or have not had an ID designator defined by the acquirer 18, it is more likely that the two merchant location IDs are in fact a match. If the acquirer-applied IDs themselves match, again it is still more likely that the merchant locations themselves are a match.

One aspect of the described method above looks to data that is intrinsic to the network operator 22, which is to say data that is part of the transaction entries which are processed by the network operator 22. Alternately, optionally, and/or additionally, the network operator 22 may supplement its merchant location data with extrinsic elements that are not necessary to transaction processing, but still useful in other business aspects. For example, the network operator 22 it may associate with a given merchant location ID a merchant identifier assigned to the merchant location by a third party (e.g., a DNB account number supplied by Dun & Bradstreet). If the same third party identifier is applied to two different merchant location entries, it is more likely (though not conclusive) that they are in fact the same merchant location.

Based on the above-described factors, i.e., merchant location name match string similarity value, merchant location street address string similarity value, other merchant location data fields, flag indications, external data fields, etc., machine learning techniques can be used to identify patterns among the likely matches. For example, a logistic regression model may be been built to capture these patterns. Other techniques to perform the machine learning on an analyst-supplied sample set may include a linear regression model, or a neural network. Any of the foregoing machine-learning techniques may involve providing a sample learning set of exemplary match/no-match pairs as confirmed by human analysis to establish the parameter of the matching.

A numeric prediction, which according to just one particular embodiment of the present disclosure is a logistical regression, can be performed 110 to determine a probability or likelihood that two non-matching merchant location data entries are, in fact, a match and are describing one and the same merchant location. The results of this regression can be output, for example as a report 120. The probability that the subject merchant location database entry 202 and one or more of the potential matching merchant locations 204*a*, 204*b*, 204*c*, etc., is compared 112 to a predetermined threshold. If that logistic regression probability exceeds a threshold value 114, then the two entries are effectively merged in the database 200 for analysis and reporting purposes. If the threshold value is not exceeded 116, then no action is taken. The process is terminated at 118.

It will be appreciated by those skilled in the art that the method described above may be operated by a machine operator having a suitable interface mechanism, and/or more typically in an automated manner, for example by operation of a network-enabled computer system including a processor executing a system of instructions stored on a machine-readable medium, RAM, hard disk drive, or the like. The instructions will cause the processor to operate in accordance with the present disclosure.

Figure 3:
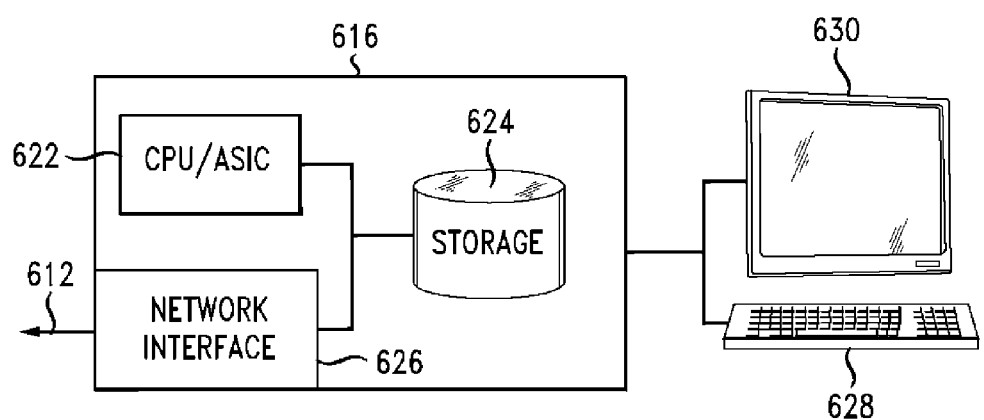
FIG. 3 illustrates schematically a representative computer according to the present disclosure, operative to implement the disclosed methods.

Turning then to FIG. 3, illustrated schematically is a representative computer 616 of the system 600. The computer 616 includes at least a processor or CPU 622 which is operative to act on a program of instructions stored on a computer-readable medium 624. Execution of the program of instruction causes the processor 622 to carry out, for example, the methods described above according to the various embodiments. It may further or alternately be the case that the processor 622 comprises application-specific circuitry including the operative capability to execute the prescribed operations integrated therein. The computer 616 will in many cases includes a network interface 626 for communication with an external network 612. Optionally or additionally, a data entry device 628 (e.g., keyboard, mouse, trackball, pointer, etc.) facilitates human interaction with the server, as does an optional display 630. In other embodiments, the display 630 and data entry device 628 are integrated, for example a touchscreen display having a GUI.

Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method of determining whether a subject merchant location database entry and a candidate merchant location database entry are describing the same merchant location notwithstanding the presence of differences between the subject merchant location database entry and the candidate merchant location database entry, wherein each of the subject merchant location database entry and the candidate merchant location database entry includes a DBA name text field designating the doing business as (DBA) name of each respective merchant location, a street address text field designating the street address of the location of each respective merchant location, and one or more additional descriptive fields descriptive of one or more predetermined characteristics of the respective merchant location, the method comprising:
   designating a merchant location database entry appearing in a master merchant location database or a transaction data stream to be compared as a subject merchant location database entry;
   populating a set with one or more candidate merchant location database entries located in a data warehouse database maintained by a network operator for comparison to the subject merchant location database entry, wherein each candidate merchant location database entry selected as a member of the set has a predetermined minimum textural similarity with the subject merchant location database entry on the basis of each database entry's respective DBA name text field or street address text field;
   comparing the subject merchant location database entry with each of the candidate database entries on the basis of the one or more additional descriptive fields;
   performing a logistic regression using the results of the comparing to calculate a probability that the merchant location corresponding to the subject merchant location database entry and the merchant location corresponding to one or more of the candidate merchant location database entries are the same merchant location; and
   outputting the results of the logistic regression,
   wherein the one or more additional descriptive fields retrieved from the data warehouse include a classification code, the classification code derived from a hierarchical classification, and the comparing determines whether the subject merchant location database entry or the candidate merchant location database entry includes a classification code related to an industry which is experientially known to have merchant location identification data that is either more stable or less stable than other industries, and the logistic regression weights the merchant location classification code with regard to whether the related industry is known to have more or less stable merchant location identification data.

2. The method according to claim 1, wherein the one or more additional descriptive fields retrieved from the data warehouse include at least one field containing data selected from the group comprising a classification code related to the respective merchant location's line of business, a merchant location city, a merchant location zip code, a flag related to whether the merchant location has a taxpayer identification number, a merchant location taxpayer identification number, a flag related to whether the merchant location has an acquirer-defined merchant location identification, an acquirer-defined merchant location identification, a flag related to whether the merchant location is part of a group of merchant locations that are considered in the aggregate, a label related to a group of merchant locations with which the individual merchant location is considered in the aggregate, and an identifier applied to the merchant location by a third party service provider.

3. The method according to claim 2, wherein the classification code is derived from a hierarchical classification, and the comparing determines whether the respective merchant classification codes are identical, are related by being in the same branch of a hierarchy, or are unrelated.

4. The method according to claim 1, further comprising:
   making a determination that the subject merchant location data entry and one or more of the candidate merchant location data entries relate to the same merchant location where the results of the logistic regression indicate a probability that is equal to or greater than a predetermined threshold.

5. The method according to claim 1, wherein populating the set with one or more candidate merchant location database entries comprises selecting those entries whose DBA name text field or street address text field exhibit a threshold numerically calculated degree of textual similarity with the corresponding DBA name text field or street address text field of the subject merchant location database entry.

6. A system for determining whether a subject merchant location database entry and a candidate merchant location database entry are describing the same merchant location, the system comprising:
   a machine-readable database storing merchant location database entries, each merchant location database entry having a DBA name text field designating the doing business as (DBA) name of each respective merchant location, a street address text field designating the street address of the location of each respective merchant location, and one or more additional descriptive fields descriptive of one or more predetermined characteristics of the respective merchant location;
   a processor; and
   a tangible machine-readable memory device storing a program of instructions thereon which, when executed by the processor, cause the processor to:
      designate a merchant location database entry appearing in a master merchant location database or a transaction data stream to be compared as a subject merchant location database entry;

populate a set with one or more candidate merchant location database entries located in a data warehouse database maintained by a network operator for comparison to the subject merchant location database entry, wherein each candidate merchant location database entry selected as a member of the set is chosen from the machine-readable database for having a predetermined minimum textual similarity with the subject merchant location database entry on the basis of each database entry's respective DBA name text field or street address text field;

compare the subject merchant location database entry with each of the candidate database entries on the basis of the one or more additional descriptive fields retrieved from the data warehouse database;

perform a logistic regression using the results of the comparing to calculate a probability that the merchant location corresponding to the subject merchant location database entry and the merchant location corresponding to one or more of the candidate merchant location database entries are the same merchant location; and output the results of the logistic regression, wherein the one or more additional descriptive fields retrieved from the data warehouse include a classification code, the classification code derived from a hierarchical classification, and the comparing determines whether the subject merchant location database entry or the candidate merchant location database entry includes a classification code related to an industry which is experientially known to have merchant location identification data that is either more stable than or less stable than other industries, and the logistic regression weights a merchant location classification code with regard to whether the related industry is known to have more or less stable merchant location identification data.

7. The system according to claim 6, wherein the one or more additional descriptive fields retrieved from the data warehouse include at least one field containing data selected from the group comprising a classification code related to the respective merchant location's line of business, a merchant location city, a merchant location zip code, a flag related to whether the merchant location has a taxpayer identification number, a merchant location taxpayer identification number, a flag related to whether the merchant location has an acquirer-defined merchant location identification, an acquirer-defined merchant location identification, a flag related to whether the merchant location is part of a group of merchant locations that are considered in the aggregate, a label related to a group of merchant locations with which the individual merchant location is considered in the aggregate, and an identifier applied to the merchant location by a third party service provider.

8. The system according to claim 7, wherein the classification code is derived from a hierarchical classification, and the comparing determines whether the respective merchant classification codes are identical, are related by being in the same branch of a hierarchy, or are unrelated.

9. The system according to claim 6, wherein the program of instructions, when executed by the processor, further causes the processor to:

make a determination that the subject merchant location data entry and one or more of the candidate merchant location data entries relate to the same merchant location where the results of the logistic regression indicate a probability that is equal to or greater than a predetermined threshold.

10. The system according to claim 6, wherein populating the set with one or more candidate merchant location database entries comprises selecting those entries whose DBA name text field or street address text field exhibit a threshold numerically calculated degree of textual similarity with the corresponding DBA name text field or street address text field of the subject merchant location database entry.

11. A non-transitory machine-readable medium storing a program of instructions thereon which, when executed by a processor, cause the processor to:

designate a merchant location database entry appearing in a master merchant location database or a transaction data stream to be compared as a subject merchant location database entry, the subject merchant location database entry having a DBA name text field designating the doing business as (DBA) name of the merchant location, a street address text field designating the street address of the location of the merchant location, and one or more additional descriptive fields descriptive of one or more predetermined characteristics of the merchant location;

populate a set with one or more candidate merchant location database entries located in a data warehouse database maintained by a network operator for comparison to the subject merchant location database entry, selected from a data warehouse database of merchant location entries, each candidate merchant location database entry having a DBA name text field designating the doing business as (DBA) name of the merchant location, a street address text field designating the street address of the location of the merchant location, and one or more additional descriptive fields descriptive of one or more predetermined characteristics of the merchant location, each candidate merchant location database entry being selected as a member of the set from and each candidate merchant location database entry having a predetermined minimum textual similarity with the subject merchant location database entry on the basis of respective DBA name text field or street address text field;

compare the subject merchant location database entry with each of the candidate database entries on the basis of the one or more additional descriptive fields retrieved from the data warehouse database;

perform a logistic regression using the results of the comparing to calculate a probability that the merchant location corresponding to the subject merchant location database entry and the merchant location corresponding to one or more of the candidate merchant location database entries are the same merchant location; and output the results of the logistic regression, wherein the one or more additional descriptive fields retrieved from the data warehouse include a classification code, the classification code derived from a hierarchical classification, and the comparing determines whether the subject merchant location database entry or the candidate merchant location database entry includes a classification code related to an industry which is experientially known to have merchant location identification data that is either more stable or less stable than other industries, and the logistic regression weights the merchant location classification code with regard to whether the related industry is known to have more or less stable merchant location identification data.

12. The medium according to claim 11, wherein the one or more additional descriptive fields retrieved from the data warehouse include at least one field containing data selected from the group comprising a classification code related to the respective merchant location's line of business, a merchant location city, a merchant location zip code, a flag related to whether the merchant location has a taxpayer identification number, a merchant location taxpayer identification number, a flag related to whether the merchant location has an acquirer-defined merchant location identification, an acquirer-defined merchant location identification, a flag related to whether the merchant location is part of a group of merchant locations that are considered in the aggregate, a label related to a group of merchant locations with which the individual merchant location is considered in the aggregate, and an identifier applied to the merchant location by a third party service provider.

13. The medium according to claim 12, wherein the classification code is derived from a hierarchical classification, and the comparing determines whether the respective merchant location classification codes are identical, are related by being in the same branch of a hierarchy, or are unrelated.

14. The medium according to claim 11, wherein the program of instructions, when executed by the processor, further causes the processor to:
make a determination that the subject merchant location data entry and one or more of the candidate merchant location data entries relate to the same merchant location where the results of the logistic regression indicate a probability that is equal to or greater than a predetermined threshold.

15. The medium according to claim 11, wherein populating the set with one or more candidate merchant location database entries comprises selecting those entries whose DBA name text field or street address text field exhibit a threshold numerically calculated degree of textual similarity with the corresponding DBA name text field or street address text field of the subject merchant location database entry.

* * * * *